July 5, 1955    R. P. MORK ET AL    2,712,640
SOUND RANGING OSCILLOSCOPE
Filed March 7, 1952
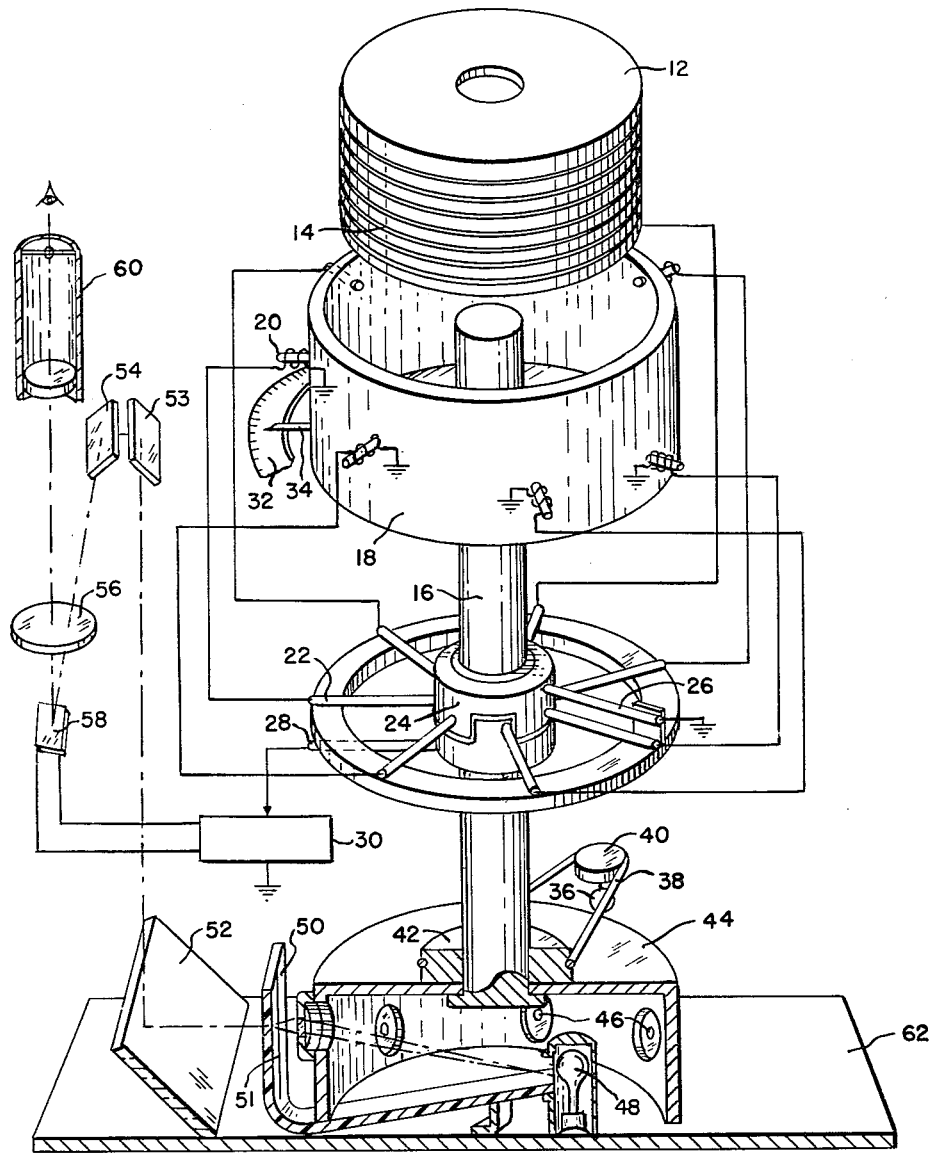
FIG. 1
FIG. 2
INVENTORS
R. P. MORK
C. W. CLAPP
BY
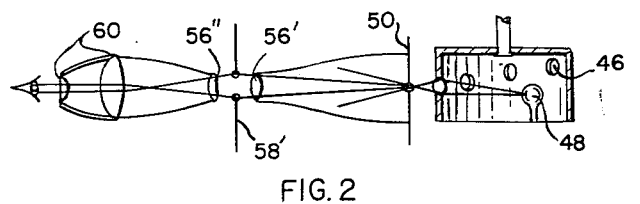
Attorney

United States Patent Office 2,712,640
Patented July 5, 1955

2,712,640

SOUND RANGING OSCILLOSCOPE

Raymond P. Mork, Needham Heights, Mass., and Charles W. Clapp, Scotia, N. Y., assignors to the United States of America as represented by the Secretary of the Army Application March 7, 1952, Serial No. 275,338

5 Claims. (Cl. 340—149)

This invention relates to sound ranging apparatus and more particularly to oscilloscope means for comparison of phase of a plurality of recorded wave forms. Particularly in the case of military apparatus for such purposes, portability, immediate determination of data, and minimum need for expendable supplies are of primary importance. These requirements effectively eliminate the use of photographic recordings. Accordingly it is the prevailing practice to make magnetic recordings corresponding to at least 3 points of each of one or more horizontal planar arrays and to compare the recordings corresponding to each array by an oscilloscope; the same amplifiers can be used for both recording and comparison and operate from a small power supply.

Comparison of recorded wave-forms broadly is illustrated by Arndt Patent No. 2,378,383. Early development of sound ranging in which the device may be used is illustrated in Keiser application Serial No. 350,784, filed April 23, 1953, a continuation of abandoned application Serial No. 591,763 filed May 3, 1945, in Munson et al. (improvement) Patent No. 2,418,136, in Weinstein et al. (Keiser) (improvement) Patent No. 2,573,748, and divisional application S. N. 193,239, filed October 31, 1950, now abandoned, in which there is a disclosure of the overall system and a magnetic mirror oscilloscope analogous to that of Blondel in which the light beam instead of being focused onto a ground glass or other screen from which a small part of the diffused light would reach the eye, is directed into the eyepiece used by the operator, in other words focussed directly onto the retina in the eye of the operator, thus permitting operation by a very low power lamp even for very high frequency signals. The sweep mirror of this device was, in accordance with the general practice of magnetic mirror oscilloscopes, a rotating mirror, but for this use was rotated together with the recorded data, actually a magnetic recording. Since only a fraction of each record need be reproduced for comparison, the phase relations of various pickup heads were coordinated with successive sweeps from the multiface sweep mirror to permit corresponding portions of each wave to be displayed in successive portions of each single rotation of the record. Simultaneously the sweeps for the various waves were biased to slightly different base lines for ease in identifying and adjusting the waves to appear in phase. The extent of adjustment necessary for this purpose indicated the time difference in arrival of the various waves, in terms of rotational position of the records, and the ratio of these time differences indicated by simple trigonometry the angle at which the wave front had crossed the array, providing its velocity across the array were constant (although unknown) and the rotational speed of the recorder during the time involved were constant (although unknown). A very light low power motor for both recording and reproduction can be made to meet these simple limitations.

The object of the present invention is to further simplify the oscilloscope comparing means by accomplishing the sweep and the base line bias within the optical system and at the same time simplify the arrangement of the optical path and further improve the lighting efficiency.

In the drawings

Fig. 1 is a diagrammatic showing of a suitable structural and circuit arrangement embodying the invention; and Fig. 2 is a simplified showing of only the optical path in which the oscilloscope mirror is shown as an aperture (at which the path would be bent), and the other mirrors, used merely to increase the length of path or to arrange the elements of the equipment for greater convenience, have been eliminated.

In Fig. 1 there is shown the mechanical system on the entire right side, the optical system at the left side and across the lower portion, and interconnecting these, in addition to the common portions of the systems in the lower right portion, the necessary electrical circuits.

The drum 12 having a plurality of magnetic tapes 14 may be considered to have been activated in a separate recording device as in Weinstein et al., column 4 line 53, although it is also practicable to embody the recording heads in the present device as in Munson. This drum is placed on the main driving shaft 16 inside the support member 18 carrying the plurality of pickup heads 20 corresponding to the tapes 14. The heads 20 are shown as spaced at equal angles about the shaft as in Weinstein in order to successively respond to records appearing at the same angular position on drum 12, assuming that recording heads had been in alignment at the time of activating the drum; in any case the phase relation between recording and reproducing must be such that corresponding portions of the various signals will be presented. For the purpose of selecting the proper signals the heads 20 are connected to suitably spaced brushes 22 in contact with cylindrical commutator 24; another brush 26 to by-pass undesired signals is arranged to short circuit all but one of the heads 20, while a further brush 28 connects the head selected by commutator 24 to amplifier 30. Assuming that the heads 20 and brushes 22 are in a proper phase relation to select corresponding portions of the various records the particular portions selected can be varied simultaneously by rotation of the support member 18. The extent of adjustment is indicated by dial 32 and pointer 34; if corresponding parts of each of the various signals are brought successively into register with an index line 51 the difference in scale readings may be used as an indication of the difference in time of their occurrence.

The shaft 16 is driven by a small motor 36 through a suitable belt 38 and pulleys 40 and 42. A hollow open ended drum or cylindrical cup 44 on the end of shaft 16 serves as the rotary support for a plurality of lenses 46 corresponding to the pickup heads 20, these lenses successively focus a spot of light from the filament of lamp 48 at a focal surface corresponding to one side of a light conducting member 50 which may have a suitable index mark 51 scratched therein and illuminated by the same lamp 48 through an extended portion of member 50 near the lamp. The lenses are spaced at equal angles about the axis to sweep out base lines due to rotation, successively, as bright moving spots of light at the focal surface superimposed on any index marks 51 appearing on such surface. They also also spaced axially to provide different base lines for various signals to be displayed as in Weinstein, Fig. 3.

Mirrors 52, 53, and 54 serve to provide a convenient orientation of the elements and to lengthen the optical path from the focal surface of member 50 to lens 56, oscilloscope mirror 58 moved by the output of amplifier 30, through lens 56 a second time, into proper focus, either virtual or actual, for the eyepiece 60, and into final actual focus on the retina of the eye of the observer. A baseplate 62 is shown to support the lamp 48, light conducting member 50 and first mirror 52, otherwise the various mechanical supports and bearings are omitted from the diagram to avoid unnecessary detail.

The diagram of Fig. 2 indicates the optical system in which the lamp 48 by means of the moving lens 46 produces a raster image or series of moving spot images superimposed on index marks at the surface of light conductor member 50. In this figure the mirrors 52, 53, and 54 have been eliminated for simplicity; it will be noted that the optical orientations of the operating elements are based on this figure and if mirrors are included must be construed in relation to the virtual rather than actual positions of the components. This raster is focussed by the lens here indicated as 56', the mirror, the same lens here indicated as 56", and the eyepiece as an image on the retina of the eye of the operator. Since this mirror must be small to respond to the output of amplifier 30 it has the effect of an aperture indicated as 58' and also produces the effect of a "bend" in the optical system; however, this bend must be within suitable limits since if it were too extensive the mirror would act as a light valve by reflecting the light outside the limits of other apertures of the optical system. Briefly stated, the optical system first produces a small coarse raster somewhat analogous to the raster on which television pictures are built up, then focuses this raster to an image and (instead of varying intensity as in Television) deflects the incremental portions of the raster by the oscilloscope mirror in accordance with the signal, to produce the raster with the deflections on the retina of the eye of the operator.

What is claimed is:

1. In a mirror oscilloscope, a source of light, a cylindrical cup member, a plurality of lenses mounted at the surface of said member at successive angular and axial positions, means to rotate said member adjacent to said source to produce a series of time sweep trace images of said source along slightly different lines, an oscilloscope mirror, means for viewing said images, said mirror being in the optical path between said images and said viewing means, the axis of said mirror being optically substantially parallel to the sweep lines of said images, a corresponding plurality of signals to be compared, switching means synchronous with said rotating means to successively switch said signals to effectuate operation of said mirror by said successive signals during successive sweeps, whereby the various signals are diplayed by apparent deflection of the various time sweep components of the different lines for ready comparison.

2. In a mirror oscilloscope, a source of light, a plurality of lenses, means to move said lenses in slightly different paths adjacent to said source to produce a series of time sweep trace images of said source along slightly different lines, an oscilloscope mirror, means for viewing said images, said mirror being in the optical path between said images and said viewing means, the axis of said mirror being optically substantially parallel to the sweep lines of said images, a corresponding plurality of signals to be compared, switching means synchronous with said moving means to successively switch said signals to effectuate operation of said mirror by said successive signals during successive sweeps, whereby the various signals are displayed by apparent deflection of the various time sweep components of the different lines for ready comparison.

3. In a mirror oscilloscope, a source of light, a cylindrical cup member, a plurality of lenses mounted at the surface of said member at successive angular positions, means to rotate said member adjacent to said source to produce a series of time sweep trace images of said source, an oscilloscope mirror, means for viewing said images, said mirror being in the optical path between said images and said viewing means, the axis of said mirror being optically susbtantially parallel to the sweep lines of said images, a source of signals, and means to effectuate operation of said mirror by said signals whereby the signals are displayed by apparent deflection of the various time sweep components of the lines.

4. In a mirror oscilloscope, a source of light, a plurality of lenses, means to move said lenses adjacent to said source to produce a series of time sweep trace images of said source, an oscilloscope mirror, means for viewing said images, said mirror being in the optical path between said images and said viewing means, the axis of said mirror being optically substantially parallel to the sweep lines of said image, a source of signals, and means to effectuate operation of said mirror by said signals whereby the signals are displayed by apparent deflection of the various time sweep components of the lines.

5. In a mirror oscilloscope, a source of light, a lens, means to move said lens adjacent to said source to produce a time sweep image of said source, an oscilloscope mirror, means for viewing said image, said mirror being in the optical path between said image and said viewing means, the axis of said mirror being optically substantially parallel to the sweep line of said image, a signal source providing a waveform for analysis, and means to effectuate operation of said mirror by said signal source whereby the waveform is displayed by apparent deflection of the various time sweep components of the line.

References Cited in the file of this patent

UNITED STATES PATENTS

| | | |
|---|---|---|
| 2,573,748 | Weinstein | Nov. 6, 1951 |
| 2,604,955 | Hawkins | July 29, 1952 |